July 25, 1933.   C. BANCROFT   1,919,355
ROTARY INTERNAL COMBUSTION ENGINE
Filed July 30, 1932   6 Sheets-Sheet 2

INVENTOR
Charles Bancroft
BY
Prindle, Bean & Mann
ATTORNEY

July 25, 1933.  C. BANCROFT  1,919,355
ROTARY INTERNAL COMBUSTION ENGINE
Filed July 30, 1932   6 Sheets-Sheet 3

INVENTOR
Charles Bancroft
BY
Prindle Bean + Mann
ATTORNEY

July 25, 1933.  C. BANCROFT  1,919,355
ROTARY INTERNAL COMBUSTION ENGINE
Filed July 30, 1932  6 Sheets-Sheet 4
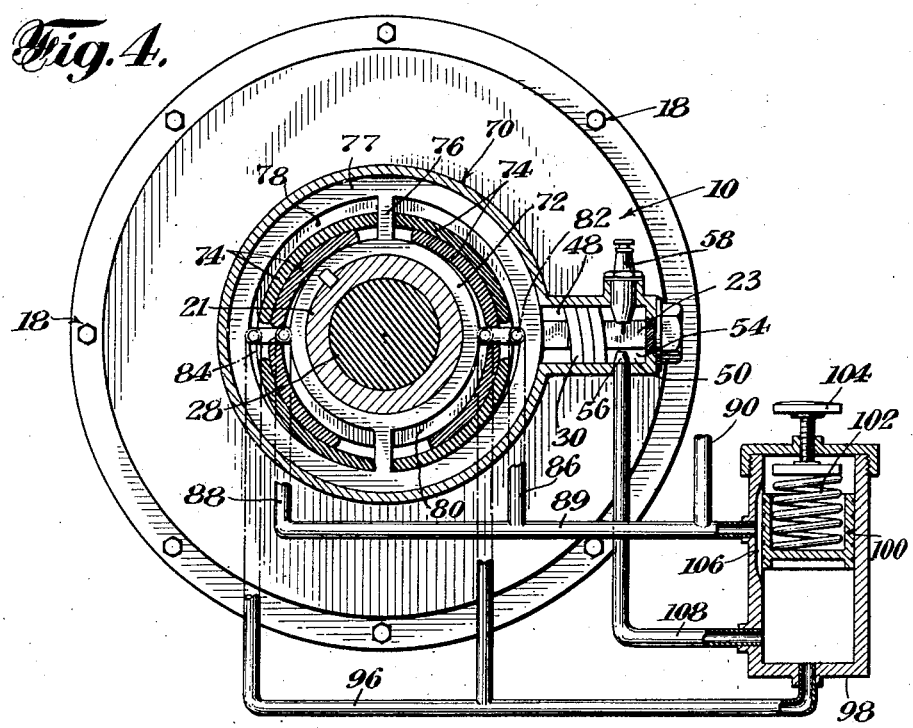
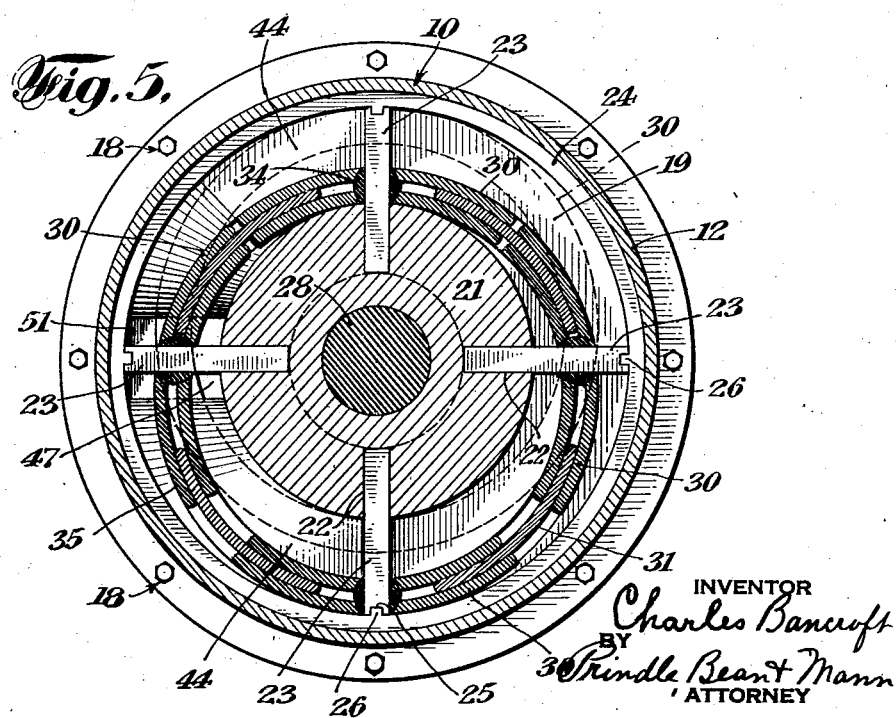

July 25, 1933.　　　C. BANCROFT　　　1,919,355
ROTARY INTERNAL COMBUSTION ENGINE
Filed July 30, 1932　　　6 Sheets-Sheet 5
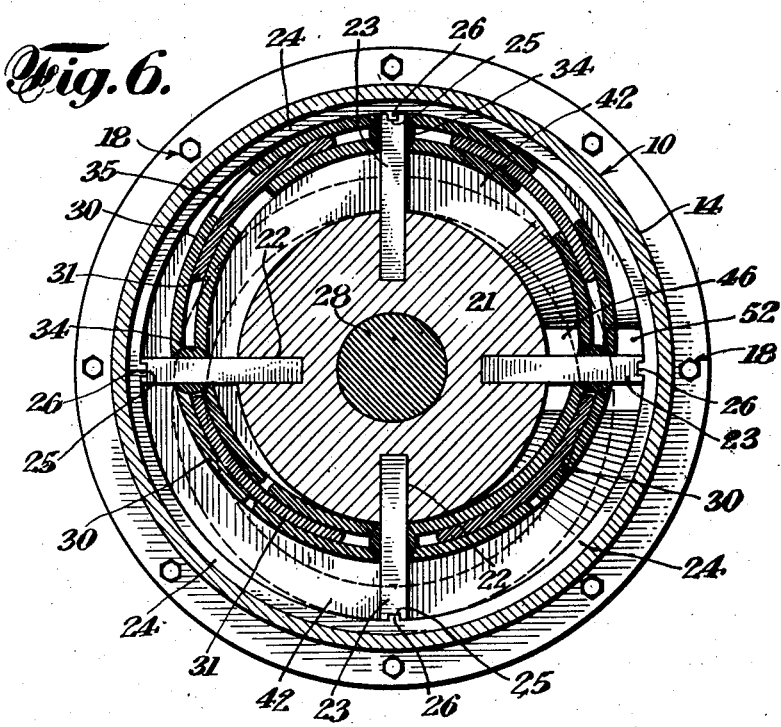
INVENTOR
Charles Bancroft
BY
Prindle Bean + Mann
ATTORNEY July 25, 1933. C. BANCROFT 1,919,355
ROTARY INTERNAL COMBUSTION ENGINE
Filed July 30, 1932 6 Sheets-Sheet 6

INVENTOR
Charles Bancroft
BY
Prindle Bean + Mann
ATTORNEY

Patented July 25, 1933

1,919,355

UNITED STATES PATENT OFFICE

CHARLES BANCROFT, OF NEW CANAAN, CONNECTICUT

ROTARY INTERNAL COMBUSTION ENGINE

Application filed July 30, 1932. Serial No. 626,515.

This invention relates to a rotary internal combustion engine having a constant flow of gases through it, and substantially constant pressures at any given place in the motor.

One object of this invention is the provision of a device which eliminates high pressure differences for the sealing members and therefore makes sealing easier.

Another object of this invention is to reduce to a minimum the amount of radiation of heat and consequent loss of power.

Another object of this invention is to provide a device in which sections that must be cooled are concentrated and exposed and in which such necessary cooling is reduced to a minimum.

Another object of this invention is to utilize to the best possible advantage the comparatively low temperature of the intake gases as a cooling medium.

Another object of this invention is the provision of a device in which the flame burns continuously in the firing passage of the motor and therefore no ignition is necessary after the device has been started.

Another object of this invention is to provide a device which will burn any liquid fuel without change of structure or parts.

Another object of this invention is to provide a device in which the fuel may be fired without being subject to the usual variation of small limits of ratio of fuel and air, which the limits of inflammability impose in the usual systems, thereby allowing higher efficiency for variable power output.

Another object of this device is to eliminate the tendency, usually found in rotary motors, of the gas to collect on the rotor wall of chambers, at the expense of the fuel mixture, due to the action of centrifugal force.

Another object of this device is to combine the advantage of carburetor and solid injection types of fuel supply.

Another object of this invention is to provide a device in which substantially the entire circumference of the rotor is employed in the useful passage of the gases, and not just sections of it.

Further objects of this invention include improvements in details of construction and arrangement whereby an efficient, simple and compact mechanism of this character is provided.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show merely for the purpose of illustrative disclosure a preferred embodiment of my invention, it being expressly understood, however, that various changes may be made in practice within the scope of the claims without digressing from my inventive idea.

In the drawings:

Fig. 4 represents a partial vertical transverse section showing the pumping system and the nozzle means for injecting fuel.

Fig. 5 represents a vertical transverse cross section taken substantially on line 5—5 of Figure 3.

Fig. 6 represents a vertical transverse cross section taken substantially on line 6—6 of Fig. 3.

Fig. 7 represents a detail showing of a vane and the sealing sleeve construction.

Figure 1:
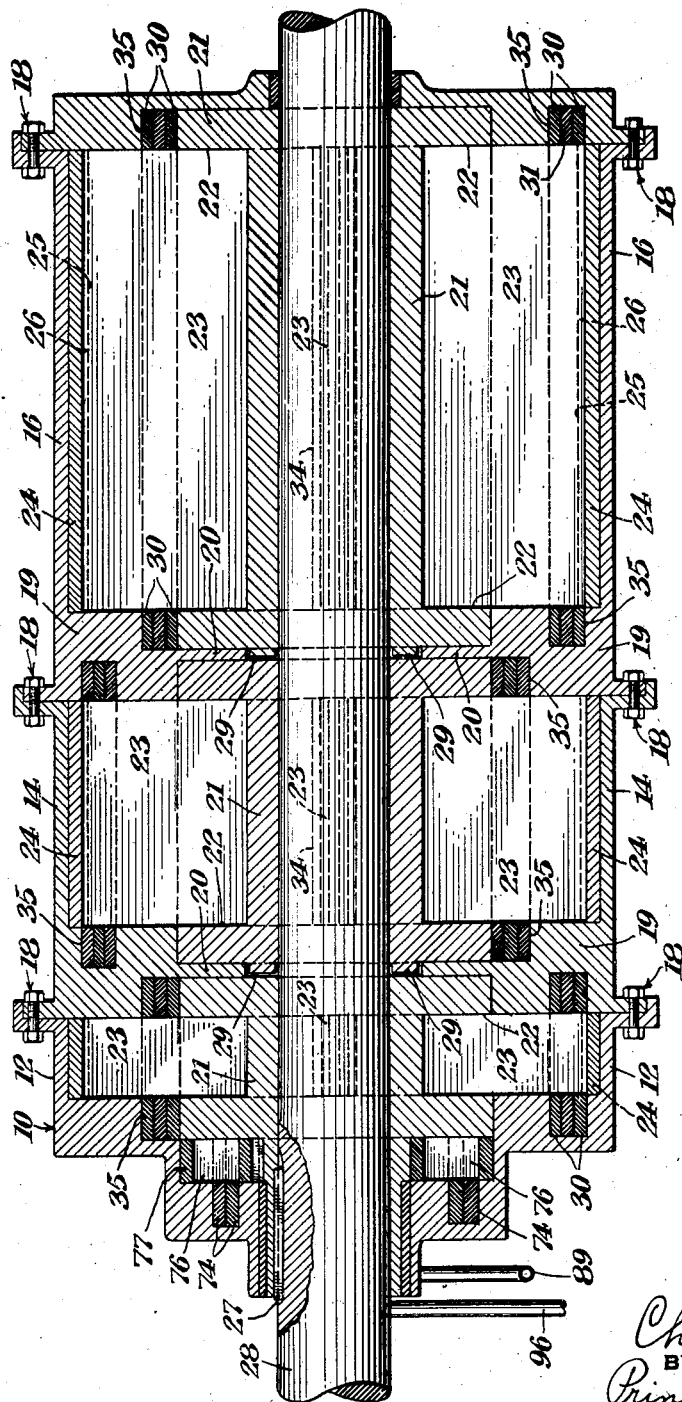
Fig. 1 represents a vertical longitudinal cross section of my device.

Referring now to the drawings, the reference character 10 designates a casing or housing made in sections 12, 14 and 16, which increase in size from section 12 to section 16, and which are bolted together as at 18 and separated by partitions 19, which form barriers between the chambers. The partitions are formed with annular thin portions 20 for affording an additional barrier between the chambers. Each of the sections contains a rotor construction comprising a hub 21 provided with radial grooves 22 to receive the inner ends of vanes 23, and outer rotatable cylinders 24. The outer ends of the vanes are provided with grooves 25 to receive projections 26 on the cylinders so that the vanes and cylinder rotate as a unit. In each section the vanes and cylinders are of the same size so as to fit therein, and the vanes and cylinders increase in size from section 12 to section 16 so that chambers are formed which similarly increase in size. The small end hub 21 near the firing passage is provided with a sleeve 27 keyed or otherwise secured to a shaft 28 which is suitably supported for rotation by the ends of the device. The larger hubs 21 are secured to end hub 21 and to each other by the tongue and groove construction 29. The construction of the hubs, vanes and cylinders is the same for all parts but the size of the vanes and cylinders varies with the sections.

For each section between the cylinders 24 and the rotor hubs 21 a plurality of contacting relatively movable concentric sealing curved sleeve portions 30 and sleeve 31 are slidably mounted on the vanes. (See Figs. 5, 6 and 7.) The outer sleeve portions 30 comprise four arcuate parts provided with openings and bearings 34 to receive the vanes. These outer sleeve portions surround the center sleeve 31 which is provided with slots to receive the vanes and provide sealing means therefor. The curved sleeve portions 30 and sleeve 31 may have relative movement during the rotation of the rotor to provide the sealing construction. The sleeve portions 30 and sleeve 31 are of a greater length than the chambers and the ends thereof are received in circular grooves 35 eccentrically positioned with respect to the rotor hubs 21, formed in the walls of the casing, so that during the rotation of the device the sleeve portions and sleeves move eccentrically with respect to the rotor hubs and, compression chambers are formed between the rotor hubs 21 and the sleeve construction, and expansion chambers between the sleeve construction and cylinders 24. Each of these sleeve portions and sleeves and eccentric groove constructions is similar but the positioning of the grooves for the different chambers is different (see Fig. 1).

Figure 3:
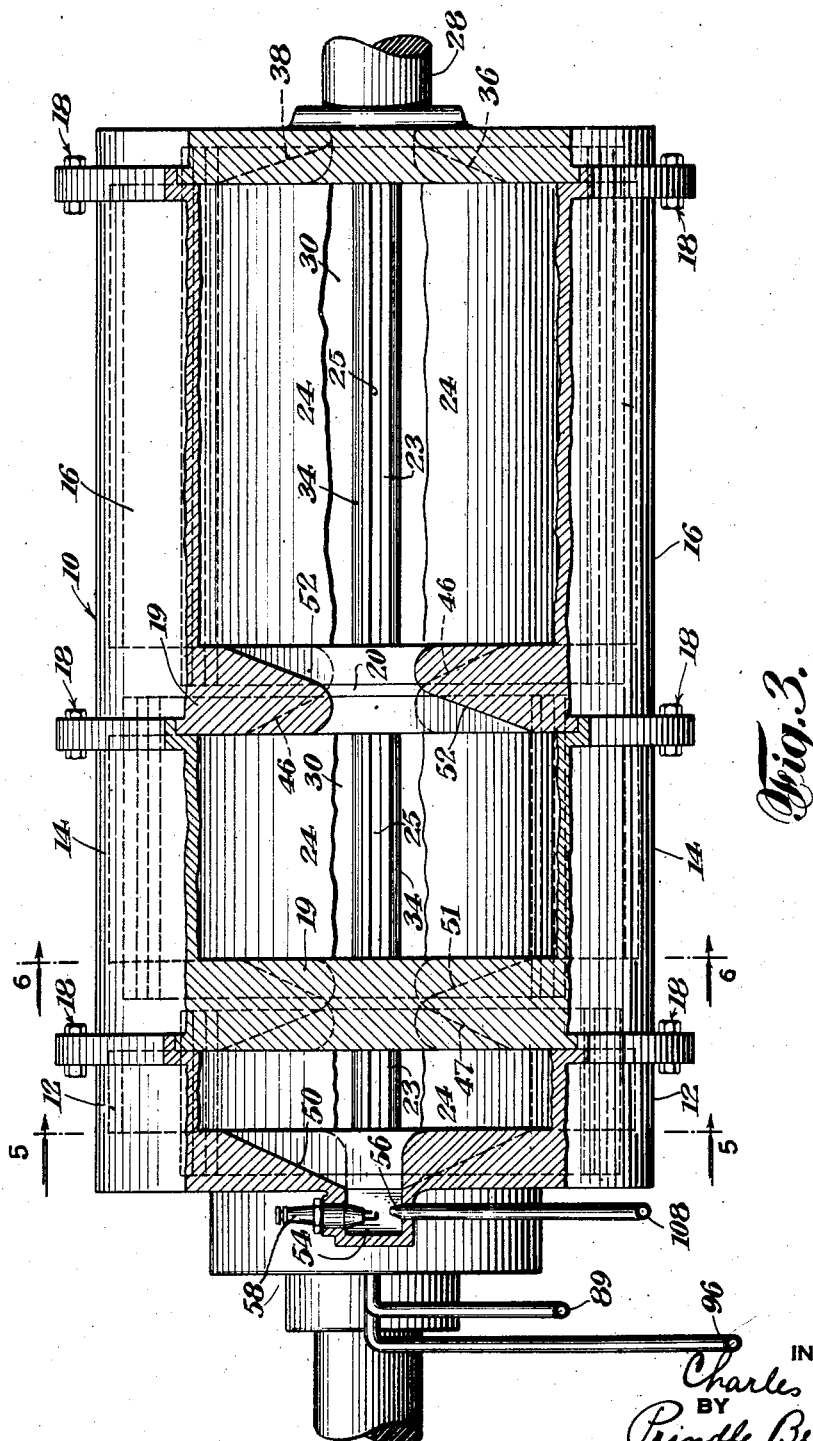
Fig. 3 represents a partial vertical longitudinal cross section with parts broken away to facilitate the disclosure.

At one end of the casing, an air inlet 36 and an exhaust gas outlet 38 are provided. It will be seen that the air is introduced near the center of the device and, therefore, tends to cool the interior of the device. The air is conducted from chamber 40 to intermediate compression chamber 42 and then to small compression chamber 44. During this operation the rate of travel and weight of air has been constant, but the volume has become smaller and the air has therefore been compressed. The partitions and the ends of the device are provided with a plurality of ports 46, 47 and 48 (see Fig. 3) for conducting the compressed air from one chamber to the other, and ports 50, 51 and 52 for conducting the burning or burned mixture from one chamber to another and to the outlet 38. As one vane passes a port, air is drawn in until a second vane passes the port and continues or takes up the work. Due to the difference of volume of the different sections, the air is compressed as it passes on toward the firing end of the motor. By compressing the gas first and then admitting fuel at the point of burning rather than admitting the fuel at the air intake, the burning is begun before centrifugal force deposits the fuel on the outside walls. In this way I overcome one of the objections of previous devices where rotary motion is imparted to the gases. At the maximum compression the air is passed through the ignition passage 54 where oil or other fuel is introduced by nozzle 56. The ignition passage has a smaller volume than the last compression chamber and due to this contraction in volume, venturi action similar to carburetor venturi is obtained at the point of fuel injection which distributes fuel well and helps maintain fuel jet nozzle at temperatures low enough to prevent injury by burning. From the foregoing it will be seen that the air, up to the time of its introduction into the firing passage has been between the sleeve construction 30, 31 and the rotor hubs.

Figure 8:
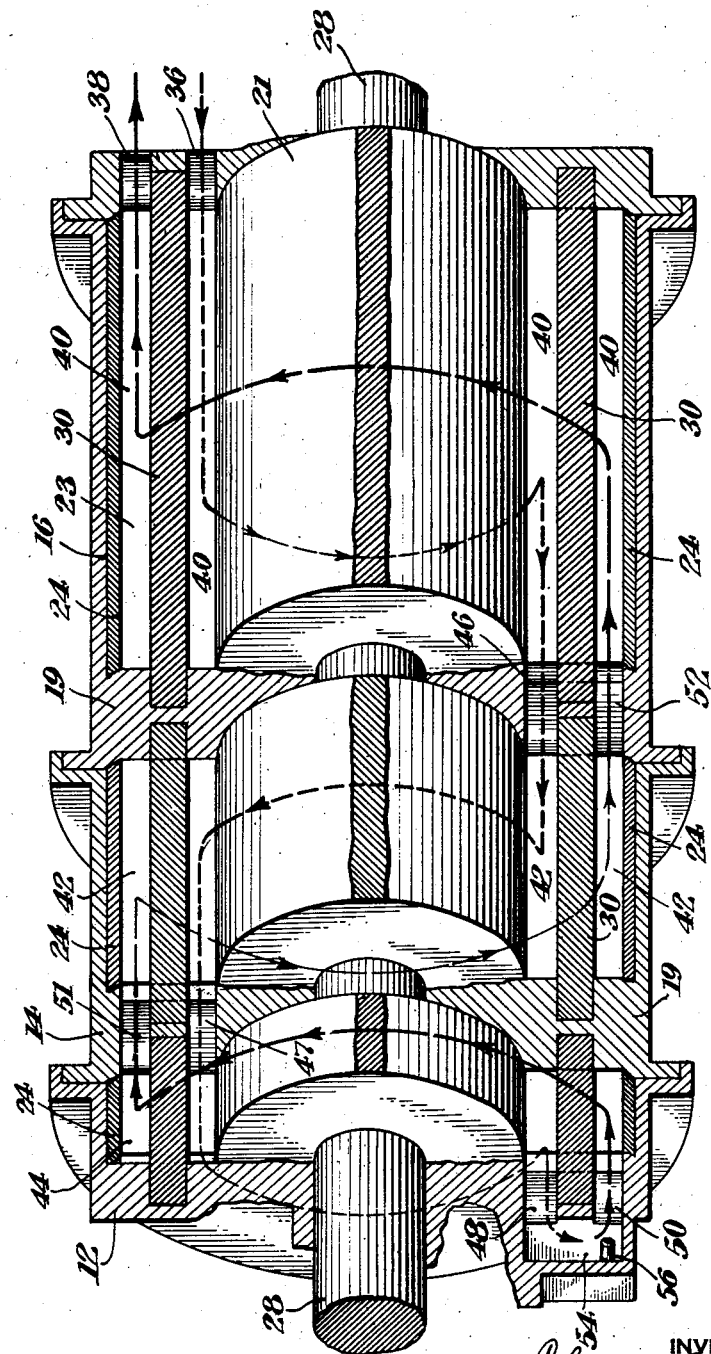
Fig. 8 represents a diagrammatical showing whereby the path of the air during compression and the path of the expansion gases may be easily traced from the inlet, through the ports and chambers and thence to the outlet.

The diagrammatic showing made in Fig. 8 will be first described to show the passage of the air and the passage of the air and fuel mixture and the operation of the device. The reference characters designate the same parts that are described later in the detailed description of the invention. When the vanes pass inlet 36, air (shown by the heavy dotted line) is drawn into chamber 46 and between rotor hub 21 and sleeve 30. The vanes move counterclockwise and the air is drawn down behind rotor hub 21 and to the front of the device shown by the light dotted line. The air is then forced through port 46 into smaller chamber 42 and is thereby compressed. Then the air is conducted up and around to port 47 and into small chamber 44 where it is further compressed. The air is then passed down and around and to port 48 which communicates with the ignition or firing passage 54. Fuel is injected at this point by nozzle 56 and the mixture burns. The burned or burning mixture (shown by long dash lines) then passes through port 50 and up and around into chamber 44 but between sleeve 30 and cylinder 24 where it acts on vane 23 and causes rotation of shaft 28. The expanding mixture then passes through port 51 and between sleeve 30 and cylinder 24 into chamber 42. From here it passes down and back (shown by lighter lines) to outlet 52 and thence to chamber 40 and through outlet 38.

Figure 2:
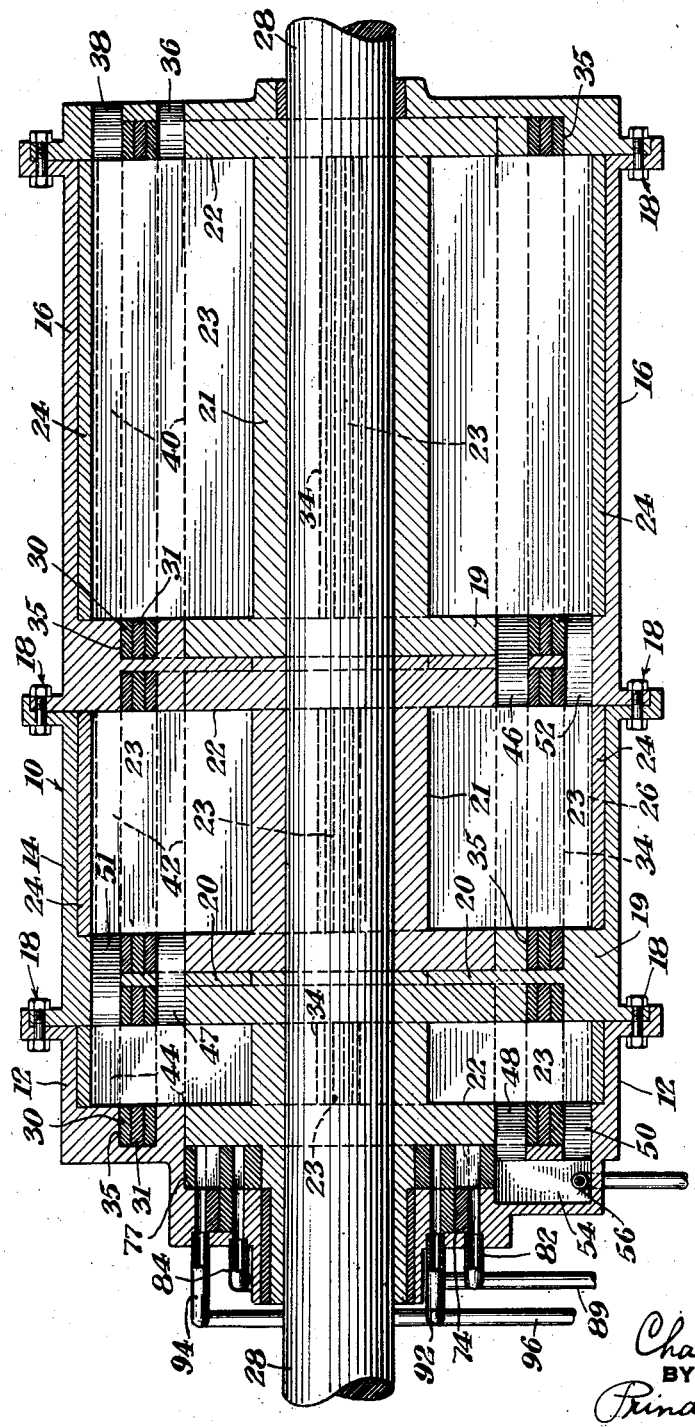
Fig. 2 represents a horizontal longitudinal cross section which shows the inlet and outlet and the ports for conducting the fluids from one chamber to the other.

The foregoing construction will now be described more in detail. Referring now to Figure 2, as the rotor construction moves counterclockwise, a vane 23 will move past inlet 36 to draw in air. After a certain amount of rotation the next succeeding vane will close off the inlet and it will start to draw in air. The air entrapped between two vanes is carried down and around to the front of the device and is then forced through port 46 to intermediate smaller chamber 42 and is thereby compressed. The air is then carried up and to the back of the device and forced through port 47 into smallest compression chamber 44. During this compressing action, the air has been confined between the sleeve constructions 30, 31 and the rotor hubs 21. The vanes merely act as paddles to keep a substantially constant weight of air moving through the motor at a substantially constant velocity, the different volumes of the sections providing the compressing and expansion action.

The air in its heated, compressed condition is now conducted through the ignition passage 54 which has a smaller volume than the last compression chamber 44 and due to this constricted volume the velocity of the air is increased, and pressure consequently lowered in the constricted portion. The fuel is injected into the ignition passages by nozzle 56 and an intimate mixture of the fuel and air is obtained. At the beginning of the operation it is necessary to ignite the mixture with a spark plug 58 or the like, unless compression temperatures are sufficiently high to ignite the mixtures without a spark plug, but after the device has been operating for a short time there is a continuous fire and burning and no external means of igniting are necessary. The means for delivering the liquid fuel will be later described. After the fuel has been added and ignited, the burning mixture is conducted to the outer, small, expansion chamber through port 50 in section 12 and into the space between cylinder 24, and sleeve constructions 30, 31, (see Figures 3 and 4). The mixture in burning expands and exerts a pressure on the vane in this chamber. The expanding mixture is then conducted, successively through ports 51 and 52 to the outer expansion chambers in sections 14 and 16 which increase in size, allowing useful expansion of burnt gases and thence to outlet 40. During this passage a greater pressure is exerted on the vanes than in the compression passage, and rotation of the rotor is thereby effected. From the foregoing it will be seen that the hottest part of the device is located near the outer surface and end thereof and therefore easily accessible for whatever cooling may be necessary.

The means for delivering the fuel to the ignition passage 54 will now be described. At the end of the casing adjacent the ignition passage 54, pump 70 is provided, which is similar in construction to the vanes and cylinders described above in connection with the engine. A rotor construction made up of a hub 72, sealing sleeves 74, connecting vanes 76 and a cylinder 77 is keyed to shaft 28. In this construction the hub 72, vanes 76 and cylinder 77 are shown as integral. Sealing sleeves 74 cooperate with the vanes 76 to provide two chambers 78, 80, whose varying volume provides a pump action, one between the sleeves 74 and the cylinder 77, and the other between the sleeves and the hub 72. The pump is provided with two inlets 82 and 84 which communicate with pipes 86, 88, 89 and a fuel pipe 90 from a fuel tank (not shown) and two outlets 92 and 94 which communicate with pipe 96 leading to a pressure regulator 98. The pressure regulator comprises a piston 100, a spring 102 and a screw means 104 for adjusting the tension of the spring. The regulator is provided with a cut away portion 106 on its inner surface adjacent the top thereof. The pipe 89, which communicates with the fuel tank and the inlets 82 and 84, also communicates with the pressure regulator at the cut away portion. When the pressure in the regulator increases beyond a predetermined maximum, piston 100 is forced upwardly against spring 102 and permits the fuel to return to the input of the pump instead of adding to the fuel in the regulator 98 and thereby raising pressure still more. A pipe 108 communicates with pressure regulator 98 and conducts the fuel under pressure to nozzle 56. The fuel is maintained under substantially constant pressure and the feeding to the nozzle is, therefore, automatic. If the pressure in the ignition passage is equal to or greater than the pressure in the regulator or at the nozzle, none or almost no fuel will be injected; if the pressure is less than or below the pressure existing in the regulator and at the nozzle, more fuel will be added, and so the fuel delivered may be automatially regulated. Pressure in the firing passage and therefore the power of the engine may thus be regulated by changing the pressure in the regulator which regulates the amount of fuel which will be injected.

From the foregoing description it is believed that the operation of the device will be evident and need not be described in detail.

The motor may be run at relatively low pressures and correspondingly low temperatures in which case the efficiency will be greater and there will be less heat lost by radiation and less necessity for cooling than when high pressures are used. To operate the device it is necessary to start it by some external means, as a starter. There is no fixed ratio of air and fuel for proper firing due to the constant fire and the fuel burning almost as in an oil burner and, therefore, the device may be run with greater ratios of air to fuel and consequent cooler temperature so that less external radiation takes place. A change in fuel does not require a change in structure since this type of automatic fuel feed would work for any liquid fuel. The device is operated by expansion due to burning gases and the pressure difference of the compression and expansion sections acts on correspondingly equal or nearly equal vanes to provide a continuous rotary motion. To provide for substantially complete combustion and useful expansion, an extended burning and expansion space is provided, and while I have shown three of such chambers, it is to be expressly understood, that a larger or smaller number may be used in order to provide for the substantially complete combustion and working expansion stroke as above pointed out. The action of the motor is smooth for the reason that the burning of the fuel is continuous.

One of the features of my invention resides in the construction of having concentrically arranged compression and expansion chambers, where air is conducted adjacent the interior of the device, i. e. inside sealing sleeves 30, 31, and keeps it relatively cool, while the expansion and combustion chambers are positioned adjacent the exterior surface of the device, i. e. outside sealing sleeves 30, 31, and no additional cooling is ordinarily required. By this construction a very compact and efficient device is provided.

The device may also be used as a steam engine. The steam (preferably superheated) is introduced through the fuel jet or nozzle 56 or a suitable substitute in the same location. The fuel supply pump and its connections are unnecessary when the device is used with steam. The air is introduced and compressed in the same way as above described in connection with the combustion engine. By mixing with the steam, the air is expanded which compensates for the loss of volume of the steam in cooling during such operation, and this provides the original pressure at a lower temperature. This lower temperature reduces the loss due to heat radiation and, therefore, reduces the loss of potential energy.

What I claim is:

1. A device of the character described, which includes, a casing provided with a plurality of sections, partitions between said sections, a rotor construction provided with a hub and vanes in said sections, a sealing sleeve in each section cooperating with said vanes to form a plurality of compression chambers between said sleeves and said rotor hub and a plurality of expansion chambers between said sleeves and said casing, said partitions being provided with ports affording communication between the chambers of each set, and means whereby said sets of chambers may communicate at a point adjacent one end of said device and means for injecting fuel at such point.

2. A device of the character described, including a casing, partitions therein to form a plurality of sections, a rotor construction having a hub and vanes in each section, sealing sleeve means slidably mounted on said vanes in each section and being eccentrically mounted with respect to said rotor hub, said sleeve means, vanes and rotor hub forming a plurality of compression chambers and a plurality of expansion chambers, said partitions being provided with ports affording communication between the chambers of each set and a connecting passage for connecting the sets of chambers adjacent one end of the device and means for injecting a motivating fluid into said connecting passage.

3. A device of the character described, including, a housing, a rotor construction provided with vanes in said housing, eccentric means for forming with the housing and rotor construction a plurality of inner chambers for compressing air and a plurality of outer chambers for expanding a mixture of compressed air and fuel and means for affording communication between said sets of chambers, and nozzle means whereby fuel may be injected into said communicating means and automatic means for supplying fluid to said nozzle means under substantially constant pressure.

4. A device of the character described, including, a housing, a rotor construction provided with vanes in said housing, eccentric means for forming with the housing and rotor construction a plurality of inner chambers for compressing air and a plurality of outer chambers for expanding a mixture of compressed air and fuel and a connecting passage for affording communication between said sets of chambers, and means whereby fluid may be injected into said connecting passage.

CHARLES BANCROFT.